Feb. 3, 1970   N. T. CASTELLUCCI   3,493,218
TOWER PACKING ELEMENT

Filed May 7, 1968   3 Sheets-Sheet 1

INVENTOR.
NICHOLAS T. CASTELLUCCI
BY
HIS ATTORNEY

INVENTOR.
NICHOLAS T. CASTELLUCCI

HIS ATTORNEY

United States Patent Office 3,493,218
Patented Feb. 3, 1970

3,493,218
TOWER PACKING ELEMENT
Nicholas T. Castellucci, Pittsburgh, Pa., assignor to Pittsburgh Corning Corporation, Pittsburgh, Pa., a corporation of Pennsylvania
Filed May 7, 1968, Ser. No. 727,242
Int. Cl. B01d 47/16
U.S. Cl. 261—95
8 Claims

ABSTRACT OF THE DISCLOSURE

A cellular ceramic tower packing element. The tower packing element has an irregular, textured outer surface that provides a relatively large accessible surface area for the phase interaction of fluids. The tower packing elements are preferably spherical in shape and formed from cellular glass nodules that have a cellular core of a plurality of individual completely closed cells and a thin, continuous outer skin. The surface of the nodule is abraded or milled to remove the thin, continuous outer skin and a portion of the layer of underlying closed cells to rupture or open the individual cells in the layer beneath the outer skin. The inner surface of the opened and exposed cells form the exterior surface of the tower packing element and provide an irregular textured exterior surface with each exposed cell cavity forming a recessed portion or a micro-cup in the tower packing element exterior surface. The tower packing element, because of its cellular structure is relatively light in weight. The tower packing elements may be randomly packed in a tower to form a multiplicity of different types of passageways for the flow of fluids therethrough. The method of this invention contemplates treating cellular ceramic material by milling or abrading to expose the adjacent inner surfaces of the cell cavities to thereby enlarge or increase the accessible surface area of the tower packing element.

BACKGROUND OF THE INVENTION

Field of the invention

This invention relates to a cellular tower packing element having a relatively large accessible area for the phase interaction of fluids and the method of making the tower packing element. More particularly, the invention relates to cellular tower packing elements having a generally spherical configuration with an irregular, textured surface formed by the inner surface of opened or exposed cell cavities and the method of making the tower packing element from a cellular ceramic nodule.

Description of the prior art

In gas-liquid contacting operations, such as distillation, absorption and desorption, one of the most commonly used contacting devices is the so-called packed tower, wherein the liquid flows downwardly over a packing material, usually in countercurrent relation to a gas that flows upwardly through the packing. The purpose of the packing material is to provide a relatively large surface area over which the liquid may flow as a relatively thin film while at the same time, providing passages for gas flow and permitting the gas to flow over and in intimate contact with the liquid film on the surfaces of the packing elements.

To maintain a high operating efficiency in the gas-liquid contacting operation, a number of factors must be considered. The packing material must be such that the pressure drop across the column is maintained at a relatively low level. The packing material should be chemically inert in the presence of the fluids that pass through the column. The packing material should be sufficiently light to produce an acceptable transverse loading on the tower walls. The packing material should also have a high mechanical durability and be relatively non-absorbent and impervious to the fluids that flow through the tower.

Tower packing elements have been made from numerous materials. Among the materials which have been employed are porcelain, carbon steel, stainless steel and other metals, glass and plastics such as polyethylene and polypropylene. The ceramic materials, metals and glass are the preferred materials from which tower packing elements are fabricated. The plastic materials have, in general, been suitable only for low temperature uses and with relatively inert solvents and solutes.

Numerous shapes of tower packing elements have been employed in the past. Among the more commonly employed shapes are Raschig rings, Berl saddles and glass helixes. Cylinders and spheres have also been used. A wire helix form of packing element is disclosed in United States Patent 2,135,703. A generally helical shaped packing element is shown in United States Patent 3,167,600. A generally star-shaped packing element is shown in United States Patent 2,198,861.

In United States Patent 3,170,969, a coated tower packing element is disclosed. In this patent, the problem of mass transfer efficiency is discussed and how the mass transfer efficiency can be increased by applying a thin coating of sub-microscopic silica particles to the external surfaces of the tower packing element. It is stated that the coating increases the liquid filming over the external surfaces of the packing element and hence, increases its mass transfer efficiency.

SUMMARY OF THE INVENTION

In accordance with the present invention, a tower packing element has been found that has an improved separating power when compared with conventional tower packing elements of various configurations. The tower packing element is generally spherical in shape and has an irregular textured external surface. It is beleived that this irregular, textured external surface increases the accessible surface area for the phase interaction of the fluids during the gas-liquid contacting operation. The irregular, textured surface may be obtained by milling or abrading a cellular ceramic nodule until the continuous outer skin and a portion of the layer of underlying closed cells are removed. The milling or abrading of the cellular ceramic nodule ruptures or opens the individual cells in the layer beneath the outer skin. The surface of the tower packing element then comprises the inner surface of the opened and exposed cells to provide an irregular textured exterior surface with each exposed cell cavity forming a recessed portion or a micro-cup in the tower packing element exterior surface.

Accordingly, the principal object of this invention is to provide a tower packing element that has a relatively large accessible surface area formed by the inner surface of a layer of opened or ruptured cells on the surface of the tower packing element.

Another object of this invention is to provide a method of forming a tower packing element with an irregular textured exterior surface from a cellular nodule having a relatively smooth continuous outer skin.

These and other objects and advantages of this invention will be more completely disclosed and described in the following specification, the accompanying drawings and the appended claims.

DESCRIPTION OF THE PREFERRED EMBODIMENT

Figures 1, 2, 3:
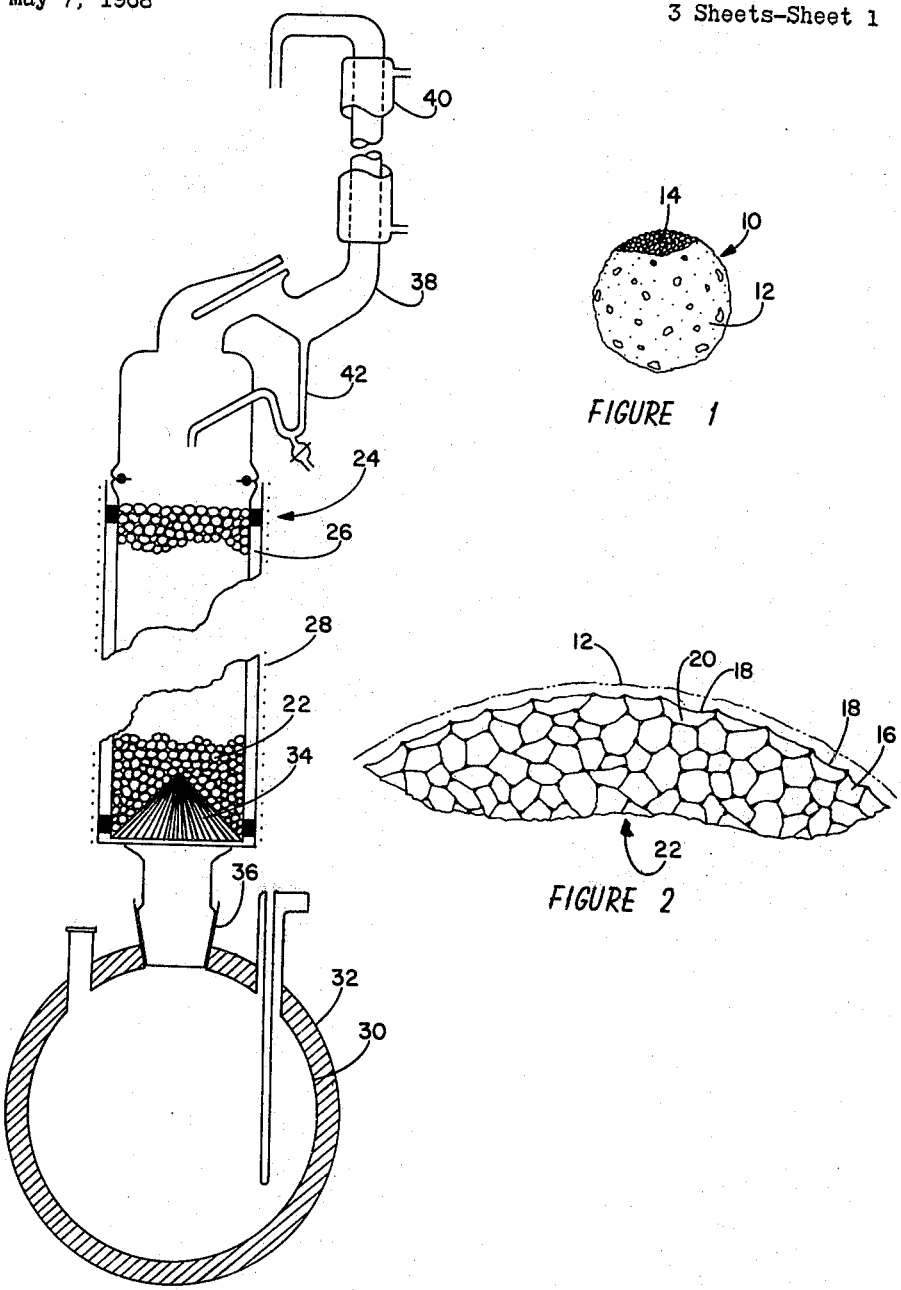
FIGURE 1 is a perspective view, partly in section, illustrating a cellular glass nodule from which the tower packing element is formed.
FIGURE 2 is a fragmentary section of the cellular nodule illustrated in FIGURE 1 after the surface of the nodule has been abraded or milled to open or expose the underlying layer of cells beneath the skin of the nodule.
FIGURE 3 is a view in elevation and in section illustrating a distillation tower with the tower packing elements of this invention positioned therein.

The cellular ceramic tower packing element of this invention provides a substantially improved packing material for a liquid-vapor contact environment. The tower packing element may be formed from a cellular glass nodule that is disclosed in United States Patent 3,354,024. Since the method of manufacture and the structure of the cellular glass nodule is completely described in this patent, the cellular nodule and its process of manufacture will be described herein only to the extent necessary for an understanding of the present invention. The description of the cellular nodule as set forth in Patent 3,354,024 is, however, incorporated herein by reference.

The cellular glass nodules are made by first admixing relatively fine glass particles with a cellulating agent such as carbon black or the like. A binder and a fluxing agent are added to this admixture. The admixture is then pelletized and the pellets are coated with a glass former that also serves as a parting agent during the cellulation process. The coated pellets are dried in a manner that a major portion of the fluxing agent migrates to the outer surface of the pellet.

The coated pellets are heated in a rotary furnace or kiln to a cellulating temperature at which the pellets bloat or cellulate. A portion of the fluxing agent that has migrated to the surface of the pellet, reacts with the glass former to form a thin, continuous outer skin of vitrified or glass-like material. The glass former also serves, during the cellulation process, as a parting agent to prevent nodules from adhering to each other.

The cellular glass nodule thus produced, has a core of individual, completely closed cells of glassy material and a continuous outer skin of a glassy material that has a composition different than the composition of the cellular core. The cellular glass nodules have a density of between about 6 lbs. per cubic foot and 25 lbs. per cubic foot. The nodules may be made within limits, in various diameters by controlling the size of the pellet or the degree of cellulation. It is well known that the desirable size of a tower packing element is dependent on the diameter of the tower or column and, with the process described in United States Patent 3,354,024 and the herein described process, the size or diameter of the tower packing element can be controlled within narrow limits.

The cellular glass nodule made according to the process described in the above-mentioned patent has a continuous outer skin of glassy material and is generally spherical in shape. Beneath this continuous outer skin of glassy material, there is a layer of individual, completely closed cells. The cellular glass nodules with the outer continuous skin is impervious and does not absorb liquids. Since the plurality of individual cells beneath the outer skin are all closed cells, the inner core of the nodule remains impervious to fluids when the layer of cells beneath the surface of the nodule are ruptured or opened so that the core of the nodule, with the outer skin removed, remains impervious to fluids.

It was discovered by subjecting the cellular glass nodules to a treatment that removes the outer skin and opens or ruptures a layer of individual closed cells beneath the outer skin, the surface morphology of the nodule as a tower packing element is changed and there is a substantial increase in the surface area of the milled or abraded nodule for the phase interaction of fluids. The outer skin of the nodule and a portion of the cell walls therebeneath, may be removed by milling the surface of the nodule by placing the nodules in a ball mill and causing the nodules to be abraded, either through contact with adjacent nodules, or contact with other material placed in the ball mill for that purpose. The new surface of the nodule, after it has been subjected to the milling or abrading process, may be described as having substantially hemispherical recesses or micro-cups in the external surface. The cavities in the individual opened cells form the irregular, textured outer surface of the tower packing element.

Referring to the drawings, the cellular glass nodule in FIGURE 1 is generally designated by the numeral 10. The cellular glass nodule 10 has a continuous outer skin 12 and a plurality of individual completely closed cells 14 that form the core of the nodule. As previously stated, the nodule made by the process described in United States Patent 3,354,024 has the continuous outer skin 12. The surface area of the cellular glass nodule available for phase interaction of fluids is limited to the surface area defined by the continuous outer skin 12. When the nodule is subjected to a milling process, the outer skin 12 is removed and the layer of individual, completely closed cells beneath the skin 12 are also partially removed to form the new external surface of the tower packing element.

FIGURE 2 illustrates a fragmentary portion of the nodule 10 after it has been subjected to milling to remove the outer skin 12 and a portion of the layer of nodules beneath the outer skin 12. In FIGURE 2, the removed outer skin 12 is indicated by dash-dot phantom lines and the layer of cells beneath the removed skin 12 is generally designated by the numeral 16. Portions of the cell walls 18 of the individual cells 16 have been removed by the milling process so that recessed or micro-cup type recessed portions 20 are formed by the remaining cell walls 18 in the layer of cells 16 beneath the removed outer skin 12. It should be understood, although reference is made to the layer of cells 16 immediately beneath the outer skin 12, that the same surface configuration of the tower packing element 22 can be obtained by removing several layers of cells with the outer skin 12.

An example of the preferred method of converting the cellular glass nodule 10 to the tower packing element 22 is as follows.

Nodules of the type disclosed in United States Patent 3,354,024 having a density of about 16 lbs. per cubic foot and a diameter of about 4.5 mms. to about 7.5 mms. were placed in a rotatable drum. The drum was made of glass and had a diameter of about 6 in. and a length of about 9 in. The drum was filled to about half capacity with the cellular glass nodules and was rotated at about 100 r.p.m. for about 6 hours. The outer skin 12 was removed by the abrasion between the nodules and the resultant tower packing elements 22 had a surface configuration similar to that illustrated in FIGURE 2. It should be understood that other means for abrading the nodules 10 to form the tower packing elements 18 may be employed other than the above described method.

FIGURE 3 illustrates a distillation column 24 that was used to compare the separating power of various commercially available tower packing elements and the tower packing element 22. The distillation column 24 includes a rectifying section 26 encased in a heating device 28 that maintained near adiabatic conditions in the column 26. The column was connected to a flask 30 that was encased in a heating mantle 32. The flask had a conventional packing support 34 that was positioned in the tapered opening 36 of the flask 30 and extended upwardly into the base of the rectifying section 26. The column 24 has a condenser 38 with a cooling means 40 connected to the upper end portion of the rectifying section 26. A condensate return 42 was provided in condenser 38 for return of the liquid. The tower packing elements 22 were positioned within the rectifying section 26 and supported on the support 34.

The previously described distillation column 24 is of conventional construction and does not form a part of this invention. It should be understood that the tower packing elements 22 may be employed in other types of liquid-gas contacting apparatus and it is not intended to limit the use of the tower packing elements 22 to the particular distillation column described.

In order to compare the different tower packing elements, the rectifying section 26 was packed in a random fashion to a depth of 183 cms. The rectifying column 26 had an inner diameter of 75 mms. The column was then heated for several hours and purged with an inert gas. The flask was charged with a 50–50 mol percent mixture of trichloroethylene-n-heptane test solution. The rectifying section 26 was preheated by the heater 28 and the test mixture was heated in the flask 30 by the heating mantle 32. The column was permitted to operate under total reflux conditions for a period of six hours and thereafter, samples were removed from both the flask 30 and from the condenser 38 at the condensate return 42. Samples were taken at several liquid throughputs in this fashion and their composition determined. The total number of theoretical plates was then calculated in a known manner using Fenske's total reflux equation. The pressure drop of the packed column was also measured at different liquid throughputs and the liquid throughput at which flooding occurred was noted.

The operating power of a tower packing element may be conveniently expressed as the equivalent number of theoretical plates at a given liquid throughput. The higher the number of theoretical plates, the higher the separating power of the tower packing element. The pressure drop expressed at different throughputs and the throughput at which flooding occurs are other properties that determine the overall efficiency of a tower packing element. Thus, with the column 24, the separating power i.e., the number of theoretical plates, the pressure drop at different liquid throughputs and the flooding throughput were measured.

Figure 4:
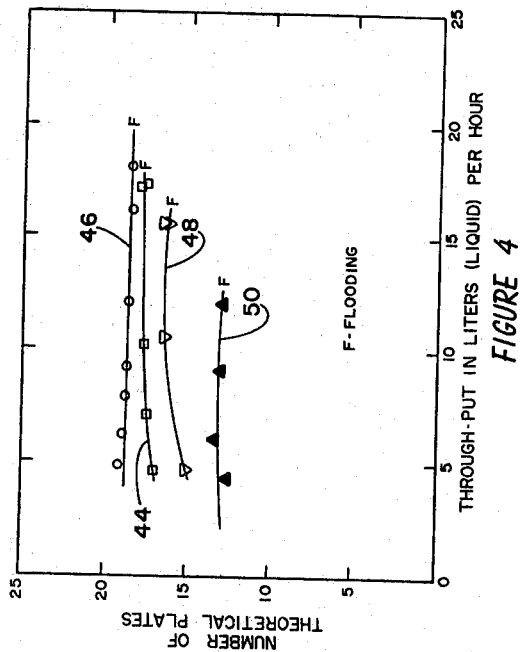
FIGURE 4 is a graphical representation of the separating power of tower packing elements of this invention and conventional glass beads.

Referring to FIGURE 4, there is graphically illustrated the separating power of tower packing elements at different throughputs expressed in liters of liquid per hour. The curve designated by the numeral 44 graphically illustrates the separating power of spherical cellular ceramic tower packing elements 22 that have a density of 12.5 lbs. per cubic foot. Curve 46 illustrates the separating power of tower packing elements 22 that have a density of 16.5 lbs. per cubic foot and curve 48 illustrates the separating power of tower packing elements 22 having a density of 23 lbs. per cubic foot. Curve 50 is a graphical representation of the separating power of conventional glass beads having a density of 160 lbs. per cubic foot.

It will be apparent from FIGURE 4 that all of the cellular ceramic tower packing elements 22 of different densities have a greater separating power than glass beads. The number of theoretical plates for the glass beads approximates 13 theoretical plates at all throughputs up to flooding. The cellular ceramic tower packing elements indicated by curves 44, 46 and 48 all have a superior separating power when compared with glass beads. For example, the cellular ceramic tower packing elements that have a density of 23 lbs. per cubic foot at throughputs of about 10 liters per hour, have a separating power of approximately 16 theoretical plates. The cellular ceramic tower elements with a density of 12.5 lbs. per cubic foot have a separating power of approximately 17 theoretical plates at the same throughput. The cellular ceramic tower packing elements with a density of 16.5 lbs. per cubic foot have a separating power of approximately 19 theoretical plates through the range of throughputs between 5 and 18 liters per hour. It is apparent from the graphical illustration in FIGURE 4, that the cellular ceramic tower packing elements having the configuration previously discussed, have superior separating power when compared with spherical glass beads. It should be noted that the tower packing elements 22 are substantially spherical in shape and have the same shape as the spherical glass beads. This indicates that the superior separating power of the cellular ceramic tower packing elements is attributable at least in part, to the irregular textured outer surface.

Figure 6:
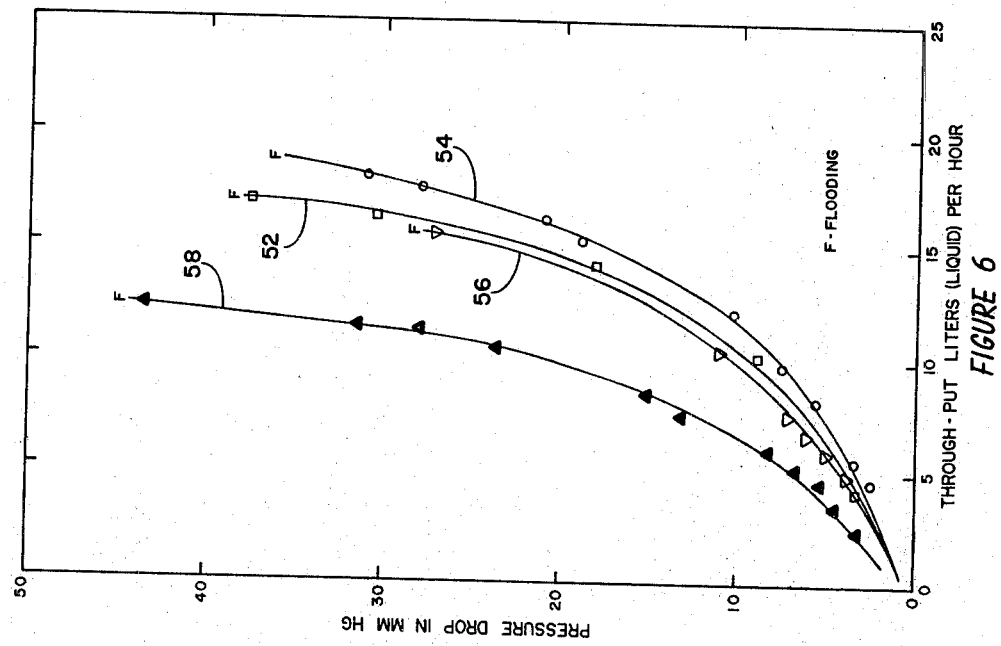
FIGURE 6 is graphical representation of the pressure drop in a column at various throughputs of liquid when the column is randomly packed with tower packing elements of the invention and with conventional glass beads.

Referring now to FIGURE 6, the pressure drop in the distillation column 24 at various throughputs is graphically illustrated for the cellular ceramic tower packing elements 22 having different densities. Curve 52 designates the pressure drop of the tower packing elements 22 having a density of 12.5 lbs. per cubic foot. Curve 54 represents the pressure drop in the column when the column is packed with elements 22 that have a density of 16.5 lbs. per cubic foot. Curve 56 represents the pressure drop in the column when the column is packed with elements 22 having a density of 23.0 lbs. per cubic foot. The curve designated by the numeral 58 represents the pressure drop for the glass beads that have a density of 160 lbs. per cubic foot.

FIGURE 6 clearly illustrates that a column packed with spherical tower packing elements 22 have a much lower pressure drop than similarly shaped glass beads. Also, the column packed with the glass beads flooded at approximately 12.2 liters per hour throughput as compared with a throughput of 20 liters per hour for the cellular ceramic tower packing elements 22 that had a density of about 16.5 lbs. per cubic foot.

Similar tests were made with an n-heptane-methylcyclohexane test mixture. Cellular ceramic tower packing elements having densities of about 16.5 lbs per cubic foot and 23 lbs. per cubic foot were compared with abraded glass beads and Raschig rings. A similar procedure was followed in this comparison. Conventional glass beads were milled in a ball mill in the presence of a silicon carbide abrasive for a period of two and one half hours to etch the surface of the glass beads in an attempt to approach the surface morphology of the claimed tower packing elements.

Figure 5:
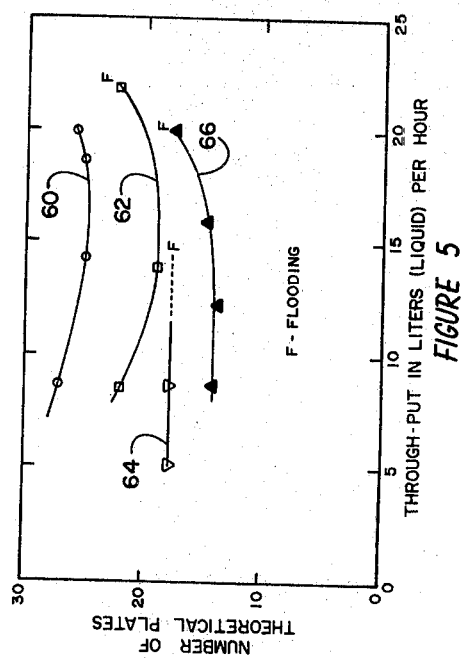
FIGURE 5 is a graphical representation of the separating power of the tower packing elements of this invention when compared with conventional abraded glass beads and with Raschig rings.

FIGURE 5 is a graphical representation of the separating power for the various materials to provide a direct comparison of the separating power of the respective tower packing elements. The curve designated by the numeral 60 in FIGURE 5 represents the separating power of the cellular ceramic tower packing elements having a density of about 16 lbs. per cubic foot. Curve 62 represents the separating power of the cellular ceramic tower packing elements having a density of 23 lbs. per cubic foot at various throughputs. Curve 64 represents the separating power of abraded glass beads and curve 66 represents the separating power of ¼ inch Raschig rings. It is apparent from the curves in FIGURE 5 that the cellular ceramic tower packing elements herein disclosed have a superior separating power when compared with abraded glass beads and Raschig rings.

The following table is a compilation of the fractional distillation properties of a variety of commercial packing materials and the cellular ceramic tower packing elements of this invention. The properties determined experimentally were throughput, pressure drop, void space, flood stage and separating power. These values are set forth in Table 1 below.

tially the same size. The comparative tests were made in separating a mixture of n-heptane and methyl cyclohexane.

Figure 7:
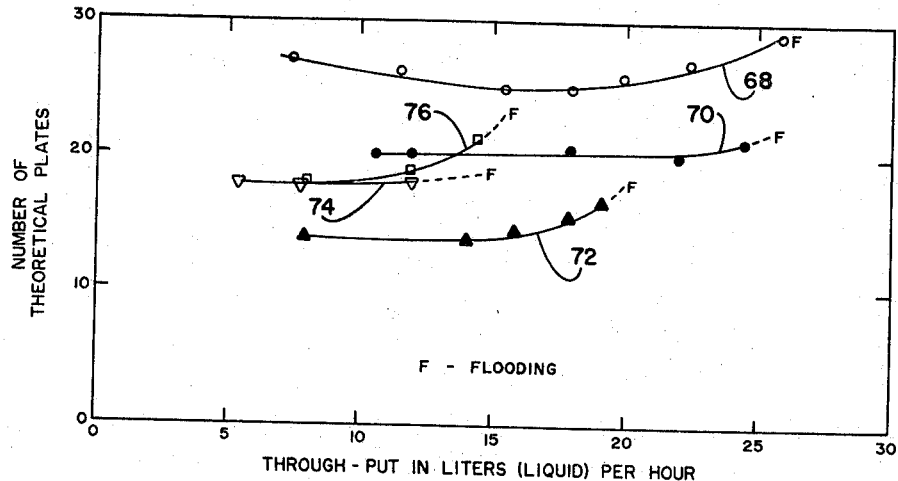
FIGURE 7 is a graphical representation of the separating power of the tower packing element of this invention and other tower packing elements.
Figure 8:
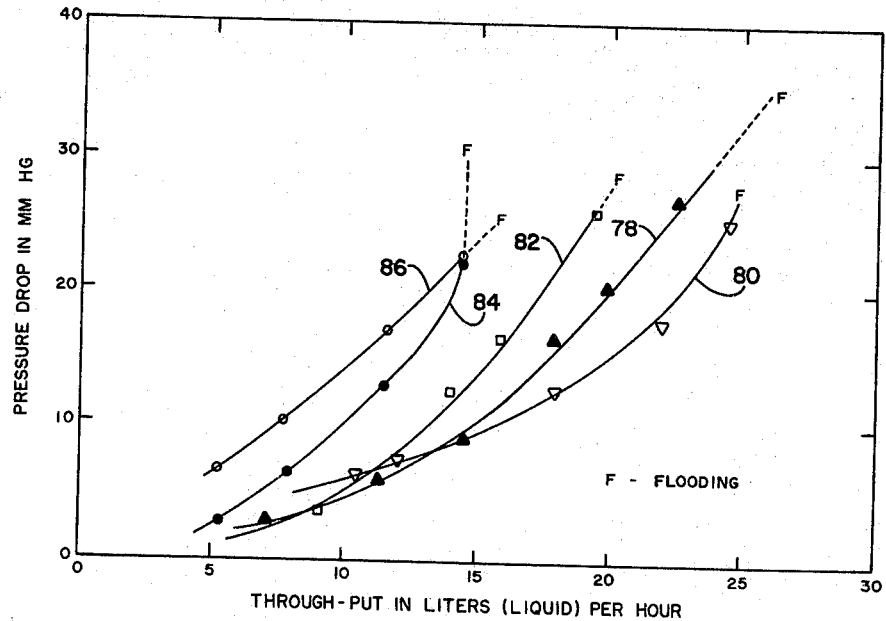
FIGURE 8 is a graphical representation similar to FIGURE 6 illustrating the pressure drop in a column at various throughputs of liquid when the column is filled with the tower packing elements compared in FIGURE 7.

FIGURE 8 is a graphical representation of the pressure drop in the distillation column for the tower packing materials discussed in reference to FIGURE 7. The curve designated by the numeral 78 represents the pressure drop of ¼ inch cellular ceramic tower packing elements having a density of 16.5 lbs. per cubic foot. Curve 80 repre- TABLE 1
Test Mixture—n-heptane/methyl cyclohexane

| Type Packing | Void Space Random Packed, percent | Pressure Drop P (in. of Hg) | Through- put (ml./hr.) | Theoretical Plates | Flood Stage (ml./hr.) |
| --- | --- | --- | --- | --- | --- |
| Perforated glass beads: 6 mm. O.D | 45.0 | .20 | 5,000 | 18.0 | 15,500 |
|  |  | .55 | 10,000 | 18.5 |  |
|  |  | .90 | 14,500 | 21.5 |  |
| Abraded glass beads: 6 mm. O.D | 38.0 | .10 | 5,000 | 18.0 | 14,500 |
|  |  | .75 | 10,000 | 17.5 |  |
|  |  | 1.40 | 14,000 | 18.0 |  |
| Berl saddles: 6 mm. O.D | 65.0 | .25 | 10,000 | 20.0 | 25,500 |
|  |  | .30 | 15,000 | 20.2 |  |
|  |  | .60 | 20,000 | 20.5 |  |
|  |  | 1.00 | 24,500 | 21.6 |  |
| Raschig rings: 6 mm. O.D | 64.0 | .10 | 5,000 | 13.5 | 20,000 |
|  |  | .25 | 10,000 | 14.0 |  |
|  |  | .60 | 15,000 | 15.0 |  |
|  |  | 1.10 | 19,500 | 17.0 |  |
| Cellular ceramic tower packing elements: 16 lbs./ft.³, 6 mm. O.D | 46.5 | .10 | 5,000 | 27.0 | 26,000 |
|  |  | .20 | 10,000 | 26.5 |  |
|  |  | .35 | 15,000 | 25.5 |  |
|  |  | .80 | 20,000 | 27.5 |  |
|  |  | 1.00 | 25,000 | 29.5 |  |
| Cellular ceramic tower packing elements 23 lbs./ft.³, 6 mm. O.D | 46.5 | .10 | 5,000 | 22.0 | 22,000 |
|  |  | .20 | 10,000 | 21.0 |  |
|  |  | .35 | 15,000 | 20.0 |  |
|  |  | .90 | 20,000 | 22.5 |  |
|  |  | 1.00 | 22,000 |  |  |

The data in Table I illustrates the percent of void space for Berl saddles and Raschig rings in a randomly packed column is much higher than cellular ceramic tower packing elements. For example, Raschig rings have a void space of 64.0%. This large free volume is represented as being the primary reason for large throughputs, high flood stage and low pressure drops obtained with this type of tower packing element. The cellular ceramic tower packing elements have 20% less void space. However, the pressure drop for the cellular ceramic nodules is lower, the throughputs are higher and the flood stage is higher. Of greater substance, however, is the fact that the cellular ceramic tower packing elements have a substantially greater separating power. For example, at a throughput of about 10 liters/hr., the separating power of the cellular ceramic tower packing elements 22 of 16 lbs./ft.³ density is the equivalent of 26.5 theoretical plates. On the other hand, the Berl saddles at a throughput of 10 liters/hr. has a separating power that is equivalent to 20 theoretical plates. The difference in the separating power of the cellular ceramic tower packing elements having different densities is attributed to the surface morphology of the tower packing element.

FIGURES 7 and 8 illustrate graphically the separating power and the pressure drop of a column randomly packed with different commercial tower packing elements, all having substantially the same size. Curve 68 in FIGURE 7 represents the separating power of cellular ceramic tower packing elements having a size of approximately ¼ inch diameter and a density of about 16.0 lbs. per cubic foot. Curve 70 represents the separating power for ¼ inch ceramic Berl saddles and curve 72 represents the separating power for ¼ inch glass Raschig rings at various throughputs. Curves 74 and 76 represent the separating power of ¼ inch diameter abraded glass beads and perforated glass beads respectively.

It will be apparent from FIGURE 7 that the cellular tower packing elements herein described have a superior separating power when compared with other commercially available tower packing elements having substantially the same size. The comparative tests were made in separating a mixture of n-heptane and methyl cyclohexane.

sents the ¼ inch cellular ceramic Berl saddles, curve 82 represents the ¼ inch glass Raschig rings, curve 84 represents the ¼ inch abraded glass beads and curbe 86 represents the pressure drop of ¼ inch perforated glass beads. Again, FIGURE 8 graphically illustrates the improved pressure drop and throughput characteristics of the cellular ceramic tower packing elements when compared with other commercially available tower packing materials.

Other advantageous features of the cellular ceramic tower packing elements are the light weight of the elements, the impervious nature of the closed cell structure and the ability to subject the tower packing elements to elevated temperatures. The tower packing elements 22 for the pressure discussed, preferably have a density of between 10 lbs. per cubic foot and about 25 lbs. per cubic foot. When compared with spherical glass beads having a density of 160 pounds per cubic foot, it is apparent that the transverse wall loading of the packed column is substantially less with the cellular ceramic tower packing elements than with glass beads. Thus, the transverse wall effect or loading force placed upon the column wall will be substantially smaller with celluar ceramic tower packing elements. As a result, the column may be made of thinner material and may be more economically constructed. The low density of the cellular ceramic tower packing elements also requires less energy to heat the tower packing elements to reach total reflux conditions in the column. It was found with the binary mixtures herein disclosed total reflux conditions were attained in one third to one fourth the time with the cellular ceramic tower packing elements than with the other tower packing elements tested.

The cellular ceramic tower packing elements have a core of individual closed cells. The closed cells are impervious to liquids and vapors and the amount of liquid hold-up within the column is thus kept at a desired level. The tower packing elements being formed from cellular ceramic material may be subjected to relatively high distillation temperatures without either mechanical or chemical degradation.

While for purposes of illustration, specific reference has been made to a distillation column, it will be appreciated that the cellular ceramic tower packing elements may be advantageously employed in numerous other environments where a packing material is positioned in a liquid and vapor phase contacting region. The cellular ceramic tower packing elements would be suitable, for example, for use in scrubbers, absorption towers and desorption towers. It should also be understood that the cellular ceramic tower packing elements may be made from materials other than formulated glass. It is believed one of the essential features of the tower packing element is the textured, irregular external surface formed by the recessed portions of opened cells.

According to the provisions of the patent statutes, I have explained the principle, preferred construction and mode of operation of my invention and have illustrated and described what I now consider to represent its best embodiment.

I claim:

1. A tower packing element having a core portion and an exterior surface,
said core portion having a multiplicity of individual completely closed cells with relatively thin continuous cell walls therebetween, said core portion being impervious to fluids,
said exterior surface formed of the remaining portions of the cell walls of individual separate opened cells on the exterior surface of the packing element,
said exterior surface being impervious and nonabsorbent, and
said remaining cell walls forming cup shaped recesses in the exterior surface of said tower packing element thereby providing a substantially increased accessible surface area for phase interaction during a gas-liquid contacting operation.

2. A tower packing element as set forth in claim 1 in which said body portion is substantially spherical in shape.

3. A tower packing element consisting essentially of,
a substantially spherical multicellular ceramic nodule having a core of a plurality of individual closed cells, said core being impervious to fluids, and
said nodule having an external surface with a plurality of open cells, said external surface being impervious and nonabsorbent,
said open cells having portions of said cell walls forming recessed portions in said external surface and providing a substantially increased accessible surface area for phase interaction during a gas-liquid contacting operation.

4. A tower packing element as set forth in claim 3 in which said multicellular nodule has a density of between about 10 lbs. per cubic foot and 25 lbs. per cubic foot.

5. A tower packing element as set forth in claim 3 in which said multicellular ceramic nodule consists essentially of glass.

6. A tower packing element as set forth in claim 3 in which a substantial portion of said recessed portions have a substantially hemispherical shape.

7. A cellular element having a substantially spherical shape with an internal core portion and an exterior surface,
said core portion having a multiplicity of individual completely closed cells with relatively thin continuous cell walls therebetween, said core portion being impervious to fluids, and
said exterior surface having an irregular configuration formed by the internal portions of opened cells on the surface of the cellular element, said exterior surface being impervious and nonabsorbent.

8. A cellular element as set forth in claim 7 in which,
said cell walls are formed of an inorganic glassy material, and
said exterior surface of irregular configuration including outwardly extending portions of the cell walls of said opened cells,
said exterior surface of irregular configuration providing a substantially increased accessible surface area.

References Cited

UNITED STATES PATENTS

| 1,901,891 | 3/1933 | Bartholomew | 65—20 |
| 2,149,688 | 3/1939 | Schott | 65—20 |
| 2,450,978 | 10/1948 | Meinzer | 65—20 |
| 2,819,887 | 1/1958 | Eversale et al. | 261—94 |
| 3,122,594 | 2/1964 | Kielback | 261—94 |
| 3,174,870 | 3/1965 | Connelly et al. | 65—20 |
| 3,293,174 | 12/1966 | Robjohns | 261—94 X |
| 3,364,656 | 1/1968 | Whiton et al. | 261—94 X |

HARRY B. THORNTON, Primary Examiner

STEVEN H. MARKOWITZ, Assistant Examiner

U.S. Cl. X.R.

65—20, 22, 61